(12) United States Patent
Simpson et al.

(10) Patent No.: US 6,602,598 B1
(45) Date of Patent: Aug. 5, 2003

(54) QUIET UNWIND STRETCH WRAP FILM

(75) Inventors: David M. Simpson, Murfreesboro, TN (US); Terry F. Jones, Murfreesboro, TN (US); Charles M. Leonard, Murfreesboro, TN (US)

(73) Assignee: SLS Patent Corporation, Murfreesboro, TN (US)

( * ) Notice: Subject to any disclaimer, the term of this patent is extended or adjusted under 35 U.S.C. 154(b) by 0 days.

(21) Appl. No.: 09/456,954

(22) Filed: Dec. 7, 1999

(51) Int. Cl.[7] ............................................. B32B 27/32
(52) U.S. Cl. .................. 428/355 EN; 428/213; 428/516; 428/523
(58) Field of Search .................... 53/441, 556, 583, 53/389.4; 428/516, 355 EN, 213, 212, 215, 523

(56) References Cited

U.S. PATENT DOCUMENTS

| | | | |
|---|---|---|---|
| 4,643,943 A | * 2/1987 | Schoenberg | 428/332 |
| 5,147,709 A | 9/1992 | Dohrer et al. | 428/213 |
| 5,273,809 A | 12/1993 | Simmons | 428/212 |
| 5,334,428 A | 8/1994 | Dobreski et al. | 428/34.9 |
| 5,516,475 A | 5/1996 | Wilson | 264/173.14 |
| 5,569,693 A | 10/1996 | Doshi et al. | 524/317 |
| 5,617,707 A | 4/1997 | Simmons | 53/441 |
| 5,884,453 A | 3/1999 | Ramsey et al. | 53/441 |

FOREIGN PATENT DOCUMENTS

WO    WO 95/15851    * 6/1995

OTHER PUBLICATIONS

Research Discloure 3771 (Undated).
Schut, Extrusion Close–Up.—7–Layer Stretch Film Properties, Plastics Technology, Feb. 1999.

* cited by examiner

*Primary Examiner*—D. Lawrence Tarazano
(74) *Attorney, Agent, or Firm*—Stites & Harbison PLLC; Richard S. Myers, Jr.

(57) ABSTRACT

A novel multi-layer stretch film comprising at least 3 layers and having excellent mechanical properties and stretch film performance, comprising at least one outer or skin layer that has little or no cling or blocking characteristics in an unstretched state, but has substantial blocking characteristics when stretched. The stretch wrap films of the present invention have little or no unwind noise when removed from a stretch wrap film roll.

31 Claims, 1 Drawing Sheet

QUIET UNWIND STRETCH WRAP FILM

FIELD OF THE INVENTION

The present invention relates to multi-layer stretch cling films having little or no cling or blocking in an unstretched state and comparatively little or no unwind noise as the film is removed from a stretch wrap film roll, but having acceptable cling performance when in a stretched state.

BACKGROUND OF THE INVENTION

In commercial packaging art, individual articles as well as bundles of articles, including bundles of articles on pallets, are frequently packaged using so called stretch cling film in a stretch wrapping technique. In the stretch wrapping technique, a thin web of film is stretched and applied under tension around the articles to be wrapped or bundled. After wrapping is complete, the film attempts to relax and thus applies a compressive force on the bundled articles prohibiting movement. It is desired that the stretch film have some inherent cling such that it will adhere to itself, and prevent relaxation back to its unstretched state so that the film will not unwrap and cause slippage of the stretched overlaid film layers. Two methods commonly used to give stretch wrap film inherent cling are the addition of high hexane extractables and the addition of low molecular weight olefinic additives.

The use of high (such as greater than 3.5%, for example) hexane extractables in the outermost layers of polyethylene film is described in U.S. Pat. Nos. 5,617,707; 5,516,475; 5,334,428; and 5,273,809; all of which are incorporated herein by reference. A drawback of using high hexane extractables containing polymers in the outermost layers exist in that high hexane extractables are believed to contribute to the problem of die lip build-up during extrusion and a build-up of low molecular weight olefinic material on fabrication equipment. Die lip build-up is typically degraded low molecular weight polyethylene and is undesirable because build up on the die lip can cause die lines that are inherent weak spots in film. Die lip build-up can also be pulled from the die as the film is extruded, resulting in black or brown spots in the film that can cause premature failure in film performance and are aesthetically unpleasing. A build-up of low molecular weight olefinic material is undesirable because the film surface may be negatively affected as the film is pulled through the fabrication equipment and may result in inconsistent cling performance.

Another concern with higher levels of hexane extractables is the contribution they make to film blocking on the roll. Films that contain resins with high levels of hexane extractables in the outermost layers can block while on the roll making the film difficult to remove resulting in holes and tears in the film prior to application. Therefore, in preferred embodiments of the present invention, the stretch wrap films have a hexane extractable level of less than about 3.5% by weight. In another preferred embodiment of the invention, the hexane extractable level is less then approximately 2% by weight in the resin or resins used in the skin layer. Also, in another preferred embodiment of the invention, no hexane extractables are used in the skin layer.

Using a tackifying or cling agent such as polybutene, polyisobutylene, and the like are also known in the art as disclosed in U.S. Pat. Nos. 5,569,693; 5,212,001; 5,175,049; 5,173,343; 5,154,981; 5,147,709; 5,141,809; 5,114,763; and 5,112,674; all of which are incorporated herein by reference. Using a cling agent adds to the cost of the final product, requires either preblending or alterations to production equipment to incorporate, and requires aging to bloom to the surface, all of which are negative aspects of its use.

It has also been disclosed that copolymers of ethylene and functional copolymers such as acrylates and vinyl acetate may be used as cling agents. For example, see U.S. Pat. Nos. 5,212,001; 5,173,343; 5,154,981; 5,141,809; 5,112,674; and 5,049,423; all of which are incorporated herein by reference. The copolymers of mention tend to be more expensive than conventional low density polyethylenes (LDPE) and linear low density polyethylenes (LLDPE) commonly used in stretch cling film formulations and tend to have lower ultimate enlongations than LLDPE resins, all of which are negative aspects for their use. Thus, in a preferred embodiment of the present invention, no cling additives are used in the films of the present invention.

As stated above, stretch wrap films are typically used in wrapping palleted loads of boxes, as well as individual boxes or articles such as furniture and the like. The stretch wrap films of the present invention may be applied using various techniques such as wrapping by hand or wrapped using a mechanical apparatus specially designed to wrap pallets, for example. In one procedure for using stretch wrap films of the present invention, the load to be wrapped is to be placed upon a platform, or turntable, which is made to rotate and in so doing, to take up stretch wrap film supplied from a continuous roll. Rotational speeds are typically 5 to 50 revolutions per minute. Regardless of the specific wrapping procedure used, at the completion of the wrapping, the stretch wrap film is cut and attached to the underlying layer by cling, tack sealing, adhesive tape, spray adhesives, and the like. When the stretch film of the present invention is applied by hand, the operator typically holds an applicator or wrapping tool that holds the stretch wrap film roll. After the operator completes wrapping, the stretch wrap film is cut or torn.

A significant concern to many users of stretch cling film is the high noise levels associated with its use. For example, some automated stretch wrap application units may apply the stretch wrap film at very high rates (i.e., 50 to 200 feet per minute). When a stretch wrap film is applied at such high rates, it can create noise at very high levels (i.e., 80 to 100 dB). While not necessarily uncomfortable to all users, prolonged and repeated exposure to such noise levels without protective equipment can lead to discomfort and well as temporary or permanent hearing loss.

There have been attempts to create stretch wrap film having reduced unwind noise that include the use of low molecular weight additives. See, for example, U.S. Pat. Nos. 5,569,693 and 5,147,709, both of which are incorporated by reference. Research Disclosure 3771, published anonymously, incorporated herein by reference, discloses that altering existing stretch wrap film application equipment can reduce the noise level of film applications. The stretch wrap film of the present invention reduces unwind noise without the addition of such additives or altering application equipment.

SUMMARY OF THE INVENTION

The present invention is a novel multi-layer stretch wrap film comprising at least 3 layers and having minimal cling or blocking when in an unstretched state (such as when wrapped on a stretch wrap film roll) and having substantial cling when elongated (such as when stretched around palleted loads). The stretch wrap films of the present invention also have excellent mechanical properties and stretch film performance. For films of the present invention, film noise when unwinding at greater than 50 feet/minute is preferably less than 80 dB, more preferably less than 70 dB. Most preferably the film noise when unwinding at 50 to 200 feet/min is less than 60 dB.

Mechanical properties that are important in stretch films include, for example, how far the film can be stretched (i.e., stretchability), the film's resistance to stretching, film tensile strength, film puncture resistance, film tear resistance, wrap, clarity and cling force. The films of the present invention are excellent in the above features.

The stretch wrap film of the present invention comprises an outer, or skin layer that provides for the quiet unwind characteristics. The stretch wrap film also comprises a sub-skin layer that provides cling characteristics and a core layer that assists in providing mechanical strength.

Preferably the stretch wrap films of the present invention comprise five or seven layers.

The resins used in the film composition include polypropylene, ethylene-propylene copolymers, low density polyethylene (LDPE), linear low density polyethylene (LLDPE), medium density polyethylene (MDPE), high density polyethylene (HDPE), metallocene-catalyzed polyethylene (mPE), very low density polyethylene (VLDPE), ultra low density polyethylene (ULDPE), and blend combinations thereof.

In accordance with the present invention, a film prepared with the described composition is especially useful in stretch wrapping, stretch bundling, and tension winding operations for wrapping or holding small or large goods.

Advantages of the disclosed invention include reduced die lip build-up, reduced accumulation of low molecular weight species on fabrication equipment, and low unwind noise. All are accomplished without added product cost or modification to existing fabrication or application equipment.

The films of the present invention may also be used in rewinding/slitting operations whereby the stretch wrap film is actually rewound in a secondary operation onto smaller cores or rewound and slit into smaller widths.

DETAILED DESCRIPTION OF THE INVENTION

Figure 1:
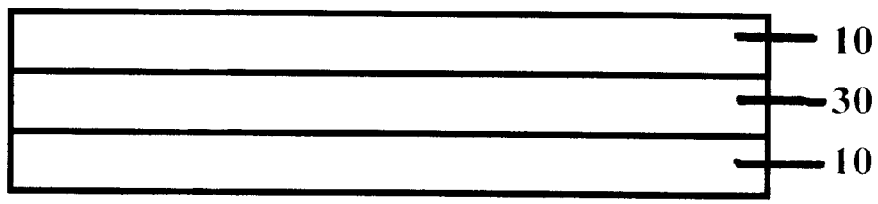
FIG. 1 is a three-layer stretch wrap film constructed in accordance with the present invention, wherein 10 represents an outer or skin layer and 30 represents a core layer.
Figure 2:
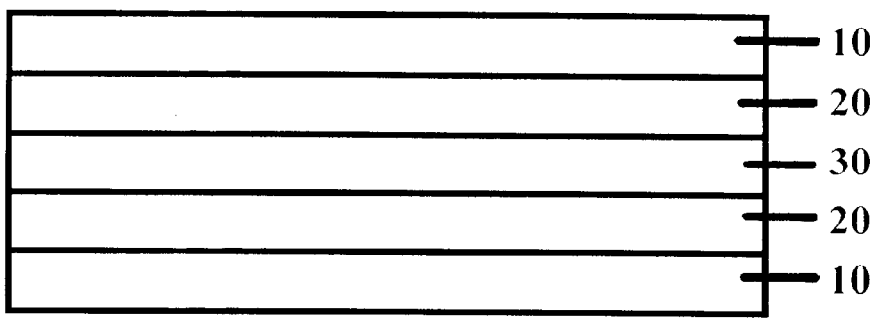
FIG. 2 is a five-layer film constructed in accordance with the present invention, wherein 10 represents an outer or skin layer, 20 represents a sub-skin layer, and 30 represents a core layer.
Figure 3:
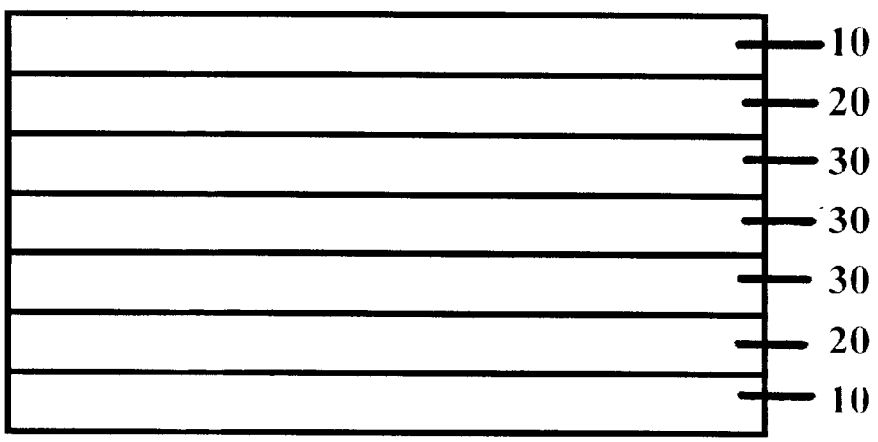
FIG. 3 is a seven-layer film constructed in accordance with the present invention, wherein 10 represents an outer or skin layer, 20 represents a sub-skin layer, and 30 represents a core layer.

The present invention relates to a novel stretch film comprising at least three layers, preferably at least 5 layers or 7 layers. The stretch films of the present invention comprise at least one outer, or skin layer that has substantially no cling when in an unstretched state, at least one sub-skin layer that provides cling characteristics, and at least one core layer that assists in providing mechanical strength and integrity.

The stretch wrap films of the present invention are typically produced by the blown film or the cast film process.

Films of the present invention include film constructions represented by, for example, A/C/B, where A represents a skin layer, C represents a core layer, and B represents a skin layer. The films of the present invention may also be represented by the formula A/C/B/C/A, wherein A, C, and B represent the same or different skin, sub-skin, and core layers, respectfully. The layers with the same function may be different from one another in, for example, the thickness of the layer and the resin used. The films of the present invention may be represented by the formula A/C/B/C/D/C/E, where A and E represent skin layers, B and D represent core layers, and C represents sub-skin layers. The composition and arrangement of the layers may vary with the same or different polymer resins selected for specific film end-use properties.

Other examples of film layer construction of the present invention include A/B/C/D where A and D are skin layers, B is a sub-skin layer, and C is the core layer; A/B/C/D/E where A and E are skin layers, B and D are sub-skin layers, and C is the core layer; A/B/C/D/E/F where A and F are skin layers, B and E are sub-skin layers, and C and D are core layers; and A/B/C/D/E/F/G where A and G are skin layers, B and F are sub-skin layers, and C, D and E are core layers.

Outer or Skin Layers

The stretch wrap film of the present invention comprises at least one outer or skin layer that has substantially no cling when an unstretched state. The resins used in the composition of this layer include polypropylene, ethylene-propylene copolymers, low density polyethylene (LDPE), linear low density polyethylene (LLDPE), medium density polyethylene (MDPE), high density polyethylene (HDPE), metallocene-catalyzed polyethylene (mPE), very low density polyethylene (VLDPE), ultra low density polyethylene (ULDPE), and blend combinations thereof.

The preferred polymers used to create the skin layers are ethylene homopolymers or ethylene/alpha-olefin copolymers or blends thereof that have little or no inherent cling or blocking tendencies. Applicable alpha-olefin comonomers include propylene, 1-butene, 1-pentene, 1-hexene, 4-methyl-1-pentene, 1-octene, and 1-decene, etc. The alpha-olefins range from about $C_3$ to $C_{20}$, preferably $C_3$ to $C_{10}$, more preferably from $C_3$ to $C_8$. Of the above, preferred polymers are ehtylene-butene-copolymer LLDPE, homopolymer LDPE, medium density $C_2/C_4$ or $C_2/C_6$ LLDPE, propylene, high density polyethylene (HDPE) or metallocene-catalyzed polyethylene (mPE).

Preferred resin density for this layer is between 0.880 and 0.960 g/cc density, preferably between 0.910 and 0.940 g/cc, and more preferably between 0.915 and 0.930 g/cc. The preferred resin melt index will typically be between 0.2 and 10 dg/min, preferably between 0.5 and 5 dg/min, and more preferably between 1 and 3 dg/min.

Each outer layer preferably is approximately 1 to 10 weight percent of the total film weight, preferably 2 to 5 weight percent of the total film weight, and more preferably 5 to 7 weight percent of the total film weight.

Overall, the thickness of the skin layer is such that the skin layer loses its integrity as an individual layer after being stretched at least 150% of the length of the outstretched state such that the sub-skin layer will be substantially exposed. Preferably, over 50% of the sub-skin layer will be exposed. More preferably, over 65% of the sub-skin layer will be exposed. More preferably, over 75% of the sub-skin layer will be exposed, which includes sub-skin exposure levels of 80, 85, 90 and 95% and above.

The cling performance of the stretch wrap film of the present invention before being stretched is preferably less than 80 grams/inch while cling performance after stretching is preferably greater than 100 grams/inch.

The noise level is preferably less than 60 dB using conventional wrapping units that apply the film at 50 to 200 feet/minute.

Sub-Skin Layers

The sub-skin layer is used for cling performance. Preferably, at least two sub-skin layers are present in the stretch wrap film. The resins used in the composition of this layer include polypropylene, ethylene-propylene copolymers, low density polyethylene (LDPE), linear low density polyethylene (LDDPE), metallocene-catalyzed polyethylene (mPE), very low density polyethylene (VLDPE), ultra low density polyethylene (ULDPE), and blend combinations thereof.

Preferably, the polymers used to create the sub-skin layers include ethylene homopolymers or ethylene/alpha-olefin copolymers, terpolymners or blends thereof that offer substantial cling. Applicable alpha-olefin comonomers include propylene, 1-butene, 1-pentene, 1-hexene, 4-methyl-1-pentene, 1-octene, and 1-decane, etc. The alpha-olefins range from about $C_3$ to $C_{20}$, preferably $C_3$ to $C_{10}$, more preferably from $C_3$ to $C_8$. Preferred polymers include ethylene-butene-hexene terpolymer VLDPE or ethylene-hexene copolymer/ethylene-propylene copolymer blend or ethylene-octene copolymer ULDPE.

Preferred resin density for this layer is between 0.860 and 0.940 g/cc density, preferably between 0.870 to about 0.930 g/cc, and more preferably between 0.880 and 0.920 g/cc. The preferred resin melt index will typically be between 0.2 to about 10 dg/min, preferably between 0.5 to about 5 dg/min, and more preferably between 1 to about 3 dg/min.

The sub-skin layers each comprise about 10 to 33 weight percent, preferably about 15 to 30 weight percent of the total film composition.

The sub-skin layers also may contain cling additives to assist in obtaining substantial cling performance. However, in a preferred embodiment of the present invention, cling additives are not used in the stretch wrap film product. Typical cling additives are discussed in U.S. Pat. No. 5,922,441, incorporated herein by reference.

Preferably the materials comprising the sub-skin layer have inherent cling (stretched or unstretched) of greater than 100 grams/inch.

Core Layer

The core layer provides helps provide mechanical strength to the stretch wrap films of the present invention. There may be more than one core layer and the core layers may be different one to the other in that at least two different polymer resins are used in any combination to make up the various layers. Thus, the number core layers and the composition of the core layers may be varied depending upon the particular end use as determined by one of ordinary skill in the art.

The resins used in the composition of this layer include polypropylene, ethylene-propylene copolymers, low density polyethylene (LDPE), linear low density polyethylene (LDDPE), medium density polyethylene (MDPE), high density polyethylene (HDPE), metallocene-catalyzed polyethylene (mPE), very low density polyethylene (VLDPE), ultra low density polyethylene (ULDPE), and blend combinations thereof.

Preferably, the polymers used to create the core layer(s) include ethylene homopolymers or ethylene-alpha-olefin copolymers or blends thereof. Applicable alpha-olefin comonomers include propylene, 1-butene, 1-pentene, 1-hexene, 4-methyl-1-pentene, 1-octene, and 1-decane, etc. The alpha-olefins range from about $C_3$ to $C_{20}$, preferably $C_3$ to $C_{10}$, more preferably from $C_3$ to $C_8$. Preferred polymers include ethylene-hexene copolymer LLDPE or ethylene-hexene copolymer metallocene LLDPE or ethylene-octene copolymer LLDPE or mLLDPE.

Preferred resin density for this layer is between 0.880 and 0.960 g/cc density, preferably between 0.910 to about 0.940 g/cc, and more preferably between 0.915 and 0.930 g/cc. The preferred resin melt index will typically be between 0.2 to about 10 dg/min, preferably between 0.5 to about 5 dg/min, and more preferably between 1 to about 3 dg/min.

The core layer(s) each comprise about 7 to 30 weight percent, preferably about 10 to 25 weight percent of the total film composition.

The density and melt index of the outermost layers, sub-skin layers, and the core layers including in the stretch wrap film of the present invention can be adjusted buy the producer to meet total film end use mechanical property requirements.

As stated above, the multi-layer stretch films of the present invention are typically produced by the blown film or cast film process. The blown or cast film is formed by extrusion. The extruder is a conventional one using a die, which will provide the desired gauge. Some useful extruders are described in U.S. Pat. Nos. 4,814,135; 4,857,600; 5,076,988; 5,153,382; each of which are incorporated herein by reference. The gauge of the films of interest here can be in the range of about 0.3 to about 10 mils, preferably from about 0.5 to about 5 mils. Examples of various extruders, which can be used in producing the film of the present invention, are the single screw type modified with a blown film die and air ring and continuous take off equipment. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided into three sections: the feed section, the compression section, and the meeting section. Multiple heating zones are present from the rear heating zone to the front heating zone, the multiple sections and zones running from upstream to downstream. If it has more than one barrel, the barrels are preferably connected in series. The length to diameter ratio of each barrel is in the range of about 16:1 to about 30:1. The extrusion can take place at temperatures in the range of about 160 to about 270 degrees Celsius, and is preferably carried out at temperatures in the range of about 180 to about 240 degreed Celsius.

Conventional blown and cast film processes are described in *Fundamentals of Polymer Processing*, Stanley Middleman, McGraw Hill, 1977; *Polymer Extrusion*, Chris Rauwendall, Hanser Publishers, 1986; and *The Encyclopedia of Chemical Technology*, Kirk-Othmer, John-Wiley and Sons, 1981; each of which are incorporated herein by reference.

As stated above, metallocene-catalyzed polyethylene resins may be used in the stretch wrap films of the present invention. The manufacture of such resins is set forth in U.S. Pat. Nos. 5,922,441, 5,382,631, 5,380,810, 5,358,792, 5,206,075, 5,183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is incorporated herein by reference in its entirety. These catalyst systems and their use to prepare such copolymer materials are also set forth in EP 0 600 425 A1 and PCT applications WO 94/25271 and 94/26816. The low polyethylene polymers thus produced generally have a crystalline content in excess of at least 10 weight percent, generally in excess of at least 15 weight percent.

When being applied to an article or pallet, the stretch wrap film of the present invention typically will be stretched to at least 50 to 400% of its original length, with the most common range being 150 to 250%.

The melt index of the layers of the films of the present invention is determined under ASTM D-1238, Condition E. It is measured at 190 degrees Celsius and 2.16 kilograms and reported as grams per 10 minutes. Flow index is determined under ASTM D-1238, Condition F. It is measured at 190 degrees Celsius and 10 times the weight used in determining the melt index, and reported as grams per 10 minutes. Melt flow ratio (MFR) is the ratio of flow index to melt index. It is understood by those skilled in the art that the lower the melt index or flow index, the higher the molecular weight.

Cling is determined under ASTM D-4649, where film is applied to a pallet and the tail is pulled away. If cling force is noticeable, cling is judged as excellent, good, fair, or poor.

Noise during unwrapping is measured using an Extech Instruments model 407703 Sound Level Meter. Typically, the films of the present invention produce noise at a level of less than 60 dB when unwinding at speeds of approximately 350 feet/minute. During testing, the sound meter is placed or held approximately 12 to 18 inches from the stretch wrap film roll.

In another embodiment of the present invention, the stretch wrap film of the present invention may be used as a differential cling stretch wrap film. That is, the stretch wrap films of the present invention may comprise films whereby one sub-skin layer has superior cling characteristics when applied in its stretched state and the other sub-skin layer does not have superior cling characteristics (i.e., a differential cling layer or slip layer). These types of films are commonly referred to as differential cling stretch wrap films or cling/slip films. Such a film may be advantageous when several pallets or articles wrapped with stretch film are loaded beside other wrapped articles. The outermost sub-skin layer of the film (when in a stretched state) wrapping a stored or loaded pallet or article (sometimes called the "slip" layer) does not have superior cling characteristics, and therefore does not cling to an adjacent pallet or article. Therefore, chances of tearing of the stretch wrap film are reduced.

An example of an outer "slip" or differential cling layer is the outer slip layer of U.S. Pat. No. 5,922,441 incorporated herein by reference. That is, the sub-skin slip layer may be constructed of various resin materials suitable for such purposes. Examples of such resins include polyolefin resins and copolymers of polyolefins such as polyethylene, polypropylene, and combinations thereof. Suitable polymer resins additionally include copolymers of polyethylene with minor amounts of other $C_{4-10}$ olefins, particularly $C_{6-8}$ polyolefins. Preferred polyethylene resins include HPLDPE resins having a density of from about 0.92 to about 0.94 g/cm$^3$, and a melt index ($I_2$) of from about 1.0 to about 4.0 g/10 min., and LLDPE resins having a density of from about 0.925 to about 0.945 g/cm$^3$, and a melt index of from about 2.0 to about 5.0 g/10 min. Preferred polymers include polypropylenes, preferably isotactic, having a density of from about 0.89 to about 0.91 g/cm$^3$, and a melt index ($I_2$) of from about 5 to about 25 g/10 min. as determined by ASTM D1238.

The sub-skin slip layer may include any of several anti-cling, slip or anti-block additives to improve the slip characteristics of the layer. Such additives include silicas, talcs, diatomaceous earth, silicates, lubricants, etc. These additives are generally blended with the resin material in an amount of from about 100 to about 20,000 ppm. When an sub-skin slip layer is present in the stretch wrap film, a sub-skin high cling layer as described above will be located as an opposing layer.

A typical configuration of a differential cling stretch wrap film of the present invention is A/C/B/C/D/C/E where A and E are ethylene-butene copolymer LLDPE, B and D are ethylene-hexene copolymer LLDPE or ethylene-hexene copolymer metallocene LLDPE, and C is an ethylene-butene-hexene terpolymer VLDPE or ethylene-hexene copolymer/ethylene-propylene copolymer blend or ethylene-octene copolymer ULDPE.

The overall properties of the stretch wrap film of the present invention are such that they have a cling force at 200% elongation (stretched) of about 100 grams to about 300 grams as measured according to ASTM D5458.

Additionally, they have a relatively high puncture resistance as measured by the F-50 dart drop test procedure (ASTM D1709). It is the experience of those skilled in the art that the F-50 dart drop test is well correlated to the end use puncture resistance of stretch wrap films. The F-50 dart drop of a stretch wrap film is at least 75 to 200 g/mil.

The stretch wrap films of the present invention preferably have a overall transverse direction tear resistance (TD tear), as determined by ASTM D1922 of at least about 400 to about 700 g/mil and MD Elmendorf tear of at least about 50 g/mil to about 350 g/mil.

In other embodiments of the present invention, the multi-layer, thermoplastic stretch wrap film of the present invention has a MD tensile elongation (%) of 400 to 700, a TD tensile elongation (%) of 600 to 900, a MD Elmendorf tear (g/mil) of 200 to 400, a TD Elmendorf tear (g/mil) of 450 to 700, and a dart impact (g) of from 100 to 300.

The stretch wrap films of the present invention are capable of being stretched from at least about 50% to about 400% of their original lengths, preferably about 150% to about 300%.

The overall thickness of the stretch wrap film of the present invention can vary widely depending upon the particular end use as determined by one of ordinary skill in the art, but the thickness is generally in the range of the typical thickness for stretch wrap films. Thus, the thickness is not known to be critical and can be easily adjusted by one of ordinary skill in the art to fit the appropriate end use. Conventional for such films is a thickness of from about 0.4 to about 3 mils, and the application is specific. Additionally, the sub-skin and core layers may be modified according to the specific end use. For example, the thickness of the film can range from 0.35 to 10 mil, preferably from 0.35 to 5 mil, more preferably from 0.35 to 2 mil.

Furthermore, the number of layers of the stretch wrap films of the present invention can vary. For example, the stretch wrap films of the present invention may comprise three, four, five, six, and seven layers.

The following configurations are examples of the present invention:

A/B/C where A and C are skin layers, and B is the core layer; A/B/C/D where A and D are skin layers, B is a sub-skin layer, and C is the core layer; A/B/C/D/E where A and E are skin layers, B and D are sub-skin layers, and C is the core layer; A/B/C/D/E/F where A and F are skin layers, B and E are sub-skin layers, and C and D are core layers; A/B/C/D/E/F/G where A and G are skin layers, B and F are sub-skin layers, and C, D and E are core layers; $A/C_1/B/C_2/D/C_3/E$ where A and E are skin layers, $C_1$ and $C_3$ are sub-skin layers, and B, $C_2$ and D are core layers.

In one embodiment of the present invention, the multi-layer, thermoplastic stretch wrap film of comprises three polymeric layers are represented by the following formula: A/B/C, wherein A and C represent a $C_2/C_4$ copolymer LLDPE, and B is a $C_2/C_4/C_6$ terpolymer, $C_2/C_6$–$C_2/C_3$ blend, or a $C_2/C_8$ copolymer ULDPE.

In another embodiment of the present invention, the multi-layer, thermoplastic stretch wrap film comprises five polymeric layers are represented by the following formula: A/B/C/D, wherein A and D represent a $C_2/C_4$ copolymer LLDPE, B is a $C_2/C_6$ copolymer LLDPE or mLLDPE, C is a $C_2/C_4/C_6$ terpolymer, $C_2/C_6$–$C_2/C_3$ blend, or a $C_2/C_8$ copolymer ULDPE.

In another embodiment of the present invention, the multi-layer, thermoplastic stretch wrap film comprises five polymeric layers are represented by the following formula: A/B/C/B/A, wherein A is a $C_2/C_4$ copolymer LLDPE, and B is a $C_2/C_4/C_6$ terpolymer, $C_2/C_6$–$C_2/C_3$ blend, or a $C_2/C_8$ copolymer ULDPE, C is a $C_2/C_6$ or $C_2/C_8$ copolymer LLDPE or mLLDPE.

In another embodiment of the present invention, the multi-layer, thermoplastic stretch wrap film comprises seven polymeric layers are represented by the following formula: A/C/B/C/D/C/E, wherein A and E represent a $C_2/C_4$ copolymer LLDPE, and B and D are a $C_2/C_6$ copolymer LLDPE or mLLDPE, C is a $C_2/C_4/C_6$ terpolymer, $C_2/C_6$–$C_2/C_3$ blend, or a $C_2/C_8$ copolymer ULDPE.

The following example is given for illustration of the invention and is not intended to be limiting thereof.

EXAMPLE

A cast co-extruded stretch wrap film is produced on an extrusion line that consists of four 2.5 inch diameter, 30:1 L/D extruders noted as Extruders A, B, D, and E, respectfully, and one six inch 30:1 L/D extruder noted as Extruder C. The layer configuration and composition for the film were skin layers from extruders A and E at 5 weight percent each, interior layers from Extruders B and D at 10 weight percent, and the core layer from extruder C at 70 weight percent. The film is made to a thickness of 0.0008 inches and a roll width of 20 inches.

The film has a 2 dg/min melt index, 0.918 g/cc density ethylene-butene copolymer LLDPE from both Extruders A and E, a 2 dg/min melt index, 0.917 g/cc density ethylene-hexene copolymer from both Extruders B and D, and a 2.5 dg/min melt index, 0.910 g/cc density ethylene-butene-hexene terpolymer from Extruder C.

After production, the film is tested on an Orion Model 1166-12R stretch wrapper. The film had adequate elongation (greater than 200%), and good holding force. Film cling over a broad range of elongation levels (e.g., less than 150% to greater than 200%) is determined to be excellent to good.

When compared to commercial machine wrap SS-4, available from Huntsman Packaging, the film of the present invention exhibits much lower noise levels when unwinding and still has acceptable cling values.

The film of the present invention has an unwind noise of less than 60 dB while the comparative film has unwind noise in excess of 80 dB using the Extech Instruments Model 407703 Sound Level Meter with the meter being held 14 inches from the stretch wrap film roll.

The invention thus being described, it will be obvious that the same may be varied in many ways. Such variations are not regarded as a departure from the spirit and scope of the present invention, and all such modifications as would be obvious to one of ordinary skill in the art are intended to be included within the scope of the following claims.

We claim:

1. A multi-layer, thermoplastic stretch wrap film comprising:
    (a) a skin layer comprising an ethylene homopolymer, propylene homopolymer, ethylene/alpha-olefin copolymer, ethylene/alpha-olefin terpolymer, or blends thereof;
    (b) a sub-skin layer comprising an ethylene homopolymer, propylene homopolymer, ethylene/alpha-olefin copolymer, ethylene/alpha-olefin terpolymer, or blends thereof;
    (c) a core layer an ethylene homopolymer, propylene homopolymer, ethylene/alpha-olefin copolymer, ethylene/alpha-olefin terpolymer, or blends thereof;
        wherein said stretch wrap film has a cling force of no more than 80 grams/inch when in an unstretched state and a cling force of at least 100 grams/inch when stretched at least 150% of the length of the unstretched state.

2. The multi-layer, thermoplastic stretch wrap film of claim 1, wherein said skin layer is between 1 and 10 weight % of the total stretch wrap film weight.

3. The multi-layer, thermoplastic stretch wrap film of claim 1, wherein said skin layer is between 2 and 5 weight % of the total stretch wrap film weight.

4. The multi-layer, thermoplastic stretch wrap film of claim 1, wherein said skin layer is between 5 and 7 weight % of the total stretch wrap film weight.

5. The multi-layer, thermoplastic stretch wrap film of claim 1, wherein said skin layer alpha-olefins are selected from the group consisting of propylene, 1-butene, 1-pentene, 1-hexene, 4-methyl-1-pentene, 1-octene, and 1-decene.

6. The multi-layer, thermoplastic stretch wrap film of claim 5, wherein said skin layer alpha-olefins range from $C_3$ to $C_{20}$.

7. The multi-layer, thermoplastic stretch wrap film of claim 5, wherein said skin layer alpha-olefins range from $C_3$ to $C_8$.

8. The multi-layer, thermoplastic stretch wrap film of claim 1, wherein said skin layer comprises a polymer selected from the group consisting of a ethylene/butene-copolymer LLDPE, a homopolymer LDPE, a medium density $C_2/C_4$ or $C_2/C_6$ LLDPE, a propylene, and a high density polyethylene.

9. The multi-layer, thermoplastic stretch wrap film of claim 1, wherein the resin density of the skin layer is between 0.880 and 0.960 g/cc.

10. The multi-layer, thermoplastic stretch wrap film of claim 1, wherein the overall film thickness is from 0.35 to 2 mil.

11. The multi-layer, thermoplastic stretch wrap film of claim 1, wherein said stretch wrap film further comprises a differential cling layer.

12. The multi-layer, thermoplastic stretch wrap film of claim 1, comprising five layers.

13. The multi-layer, thermoplastic stretch wrap film of claim 1, comprising seven layers.

14. The multi-layer, thermoplastic stretch wrap film of claim 1, wherein the melt index is between 0.2 and 10 dg/min.

15. The multi-layer, thermoplastic stretch wrap film of claim 1, wherein the hexane extractable level is less than about 3.5% by weight.

16. The multi-layer, thermoplastic stretch wrap film of claim 1, wherein the hexane extractable level is less than about 2% by weight.

17. The multi-layer, thermoplastic stretch wrap film of claim 1, wherein the skin layer loses integrity as an individual layer upon being stretched at least 150% of the length of the outstretched state such that the sub-skin layer will be substantially exposed.

18. The multi-layer, stretch wrap film of claim 1, wherein said film exhibits a noise of no more than 60 dB when arranged as a stretch wrap film roll and unwinding on a mechanical stretch wrapping machine at a rate of from 50 to 200 feet/minute, as measured approximately 12 to 18 inches from the stretch wrap film roll.

19. A multi-layered stretch wrap film, comprising
   (a) a skin layer comprising an ethylene homopolymer, propylene homopolymer, ethylene/alpha-olefin copolymer, ethylene/alpha-olefin terpolymer, or blends thereof,
      wherein the skin layer comprises between 1 and 10 weight % of the total composition of the stretch wrap film; and
      wherein the stretch wrap film exhibits a noise of no more than 60 dB when arranged as a stretch wrap film roll and unwinding on a mechanical stretch wrapping machine at a rate of 50 to 200 feet/min, as measured approximately 12 to 18 inches from the stretch wrap film roll,
      wherein the skin layer loses integrity as an individual layer.

20. The multi-layered stretch wrap film of claim 18, further comprising
   (a) a sub-skin layer, wherein said sub-skin layer comprises about 15 to 33 weight percent of the total film composition; and
   (b) a core layer, wherein said core layer comprises between 15 to 25 weight % of the total film composition.

21. A multi-layered stretch wrap film of claim 18, comprising seven layers.

22. A multi-layered stretch wrap film of claim 18, wherein said skin layer alpha-olefins are selected from the group consisting of propylene, 1-butene, 1-pentene, 1-hexene, 4-methyl-1-pentene, 1-octene, and 1-decene.

23. The multi-layer, thermoplastic stretch wrap film of claim 21, wherein said skin layer alpha-olefins range from $C_3$ to $C_{20}$.

24. The multi-layer, thermoplastic stretch wrap film of claim 21, wherein said skin layer alpha-olefins range from $C_3$ to $C_8$.

25. The multi-layer, thermoplastic stretch wrap film of claim 18, wherein said skin layer comprises a polymer selected from the group consisting of a ethylene/butene-copolymer LLDPE, a homopolymer LDPE, a medium density $C_2/C_4$ or $C_2/C_6$ LLDPE, a propylene, and a high density polyethylene.

26. The multi-layer, thermoplastic stretch wrap film of claim 18, wherein the resin density of the skin layer is between 0.880 and 0.960 g/cc.

27. The multi-layer, thermoplastic stretch wrap film of claim 18, wherein the overall film thickness is from 0.35 to 2 mil.

28. The multi-layer, thermoplastic stretch wrap film of claim 18, wherein said stretch wrap film further comprises a differential cling layer.

29. The multi-layer, thermoplastic stretch wrap film of claim 18, wherein the melt index is between 0.2 and 10 dg/min.

30. The multi-layer, thermoplastic stretch wrap film of claim 18, wherein the hexane extractable level is less than about 2% by weight.

31. The multi-layer, thermoplastic stretch wrap film of claim 18, wherein the hexane extractable level is less than about 3.5% by weight.

* * * * *